Patented Aug. 25, 1925.

1,551,073

UNITED STATES PATENT OFFICE.

FRITZ STRAUB, OF BASEL, SWITZERLAND, ASSIGNOR TO THE SOCIETY OF CHEMICAL INDUSTRY IN BASLE, OF BASEL, SWITZERLAND.

PRODUCTION OF DYESTUFFS CONTAINING CHROMIUM.

No Drawing.    Application filed March 10, 1925.  Serial No. 14,556.

*To all whom it may concern:*

Be it known that I, FRITZ STRAUB, a citizen of the Swiss Republic, residing at Basel, Switzerland, have invented new and useful Improvements in the Production of Dyestuffs Containing Chromium, of which the following is a full, clear, and exact specification.

The invention relates to new dyestuffs containing chromium, as well as to the process of making same and to the material dyed with the new dyestuffs.

Azodyestuffs containing chromium have been described in a great number of Letters Patents. When dyes on wool in an acid bath these dyestuffs yield shades remarkable by their properties of fastness.

Quite a number of dyestuffs of the triarylmethane series, capable of being treated with chromium, are known furthermore, which, when chromed on the fibre, yield shades that are distinguished by their remarkable brightness and their good fastness to milling. These dyestuffs, as for instance the eriochromazurol B (cf. Soc. of Dyers and Colourists Colour Index No. 720), the chrome violet (cf. Soc. of Dyers and Colourists Colour Index 727), the dyestuffs of the U. S. P. 1,387,596 and 1,460,315 or the dyestuffs of the German Patent No. 189,938 and of the additions of same, yield, when treated, in substance, with agents yielding chromium, quite insoluble lakes inadapted for the purpose of dyeing.

It has been found that, in a general manner, the dyestuffs containing chromium are capable of combining with dyestuffs of the triarylmethane series adapted of being treated with chromium, yielding thus new dyestuffs containing chromium. These dyestuffs show the surprising property of being as easily soluble as the azo-dyestuffs containing chromium themselves, and as these latter, they yield on wool in an acid bath very level shades, superior with regard to the simple chromed dyestuffs by their higher brightness and by their not being influenced disadvantageously by artificial light.

The treatment of azodyestuffs containing chromium with the dyestuffs of the triarylmethane series adapted of being afterchromed may be carried out by heating the substance together for some time. This operation may also take place in the dye bath and on the fibre. The new dyestuffs form from dark red to black powders, dissolving in water to solutions with bluish-red to green and blackish-green colorations, yielding on wool, from bluish-red to blue and green fast tints, distinguished by their excellent fastness to milling and their good night color.

Example 1.

50 parts of the dyestuff from β-naphthol and 1-amino-2-hydroxynaphthalene-4-sulphonic acid described in Example 1 of U. S. P. No. 1,480,640 are dissolved in 500 parts of boiling water, 7.5 parts of the dyestuff described in Example 2 of U. S. P. No. 1,387,596 from α-naphthol-2-carboxylic acid and $CCl_4$ are added, and the mixture is boiled for some time in a reflux apparatus. The new dyestuff is then salted out, filtered and dried. It is a dark powder which dissolves in water to a blue solution having a red appearance, and dyes wool in a mineral acid bath fast tints which are purer than those obtainable with the chromed azo-dyestuff alone.

Example 2.

50 parts of the dyestuff from β-naphthol and 1-amino-2-hydroxynaphthalene-4-sulphonic acid, made as described in Example 1 of U. S. P. No. 1,480,640, are dissolved in 500 parts of hot water. 5 parts of eriochromazurol B are added and the mixture is boiled for some time in a reflux apparatus. The dyestuff, salted out as described in Example 1, is a dark powder which dissolves in water to a blue solution having a red appearance and dyes wool fast tints somewhat redder and more pure than those obtained with the chromed azodyestuff alone.

If, in this example, there is substituted eriochromcyanine R (Soc. of Dyers and Colourists Colour Index No. 722) for the eriochromazurol B, there is obtained a dyestuff which dyes wool fast, considerably redder tints.

Example 3.

The melt obtained as described in Example 1 of U. S. P. No. 1,480,640 is diluted with water and neutralized with mineral acid and then mixed with 7.5 parts of the dyestuff described in Example 2 of U. S. P. No. 1,387,596, and the mixture is heated for some time. By salting out there is obtained a dyestuff which agrees with that of Example 1.

Example 4.

There is prepared a dye-bath containing 2 per cent of the dyestuff of Example 1 of U. S. P. No. 1,480,640 and 0.05 per cent of the dyestuff of Example 2 of U. S. P. No. 1,387,596, and goods are dyed in this bath with addition of 7 per cent of sulphuric acid. The blue dyeing thus obtained is considerably purer than that obtainable by means of the dyestuff of Example 1 of U. S. P. No. 1,480,640; it is of very good fastness and is a good night colour.

In an analogous manner bluish-red tints are obtained with the dyestuff containing chromium from diazotized 1-amino-2-hydroxynaphthalene-4-sulfonic acid and phenylmethylpyrazolone and the dyestuff described in the German Patent No. 209,535, patent of addition to the Patent No. 189,938 from dimethylaminobenzaldehyde and o-cresotinic acid, whereas the dyestuff containing chromium from 2-amino-4-methyl-1-phenol-5-sulfonic acid and β-naphthol and the same triphenylmethane dyestuff yields violet tints with excellent properties of fastness and a good night color; green tints are obtained with the dyestuff from diazotized 4-chloro-2-aminophenol-5-sulfonic acid and β-naphthylamine and the dyestuff of the U. S. P. No. 1,460,315 from phenyl-chloroform and α-hydroxynaphthoic acid.

Example 5.

Goods which have been dyed in a bath containing 0.05 per cent of the dyestuff of Example 2 of U. S. P. No. 1,387,596, with addition of 1.5 per cent of acetic acid of 40 per cent strength, are dyed in a bath containing 2 per cent of the dyestuff of Example 1 of U. S. P. No. 1,480,640 with addition of 7 per cent of sulphuric acid. There is obtained a dyeing similar to that of the preceding example. So also wool may be dyed first in a bath containing 2 per cent of the azo-dyestuff containing chromium and then in a bath containing 0.05 per cent of the triarylmethane dyestuff.

What I claim is:

1. The herein described process for the manufacture of dyestuffs containing chromium by causing dyestuffs of the triarylmethane series capable of being chromed to react on azodyestuffs containing chromium.

2. The herein described process for the manufacture of dyestuffs containing chromium by causing unsulfonated dyestuffs of the triarylmethane series capable of being chromed to react on azodyestuffs containing chromium.

3. The herein described process for the manufacture of dyestuffs containing chromium by causing unsulfonated dyestuffs of the triarylmethane series capable of being chromed to react on such azodyestuffs containing chromium, which are obtained by action of agents yielding chromium on monoazodyestuffs prepared by combining o-hydroxydiazo derivatives with naphthols.

4. The herein described process for the manufacture of dyestuffs containing chromium by causing unsulfonated dyestuffs of the triarylmethane series capable of being chromed to react on such azodyestuffs containing chromium which are obtained by combining diazo derivatives of 1-amino-2-hydroxynaphthalene-4-sulfonic acid with naphthols.

5. As new products the new dyestuffs containing chromium obtained by causing dyestuffs of the triarylmethane series capable of being chromed to react on azodyestuffs containing chromium, which dyestuffs form from dark red to black powders, dissolving in water to solutions with bluish-red to green and blackish-green colorations, yielding on wool, from bluish-red to blue and green fast tints, distinguished by their excellent fastness to milling and their good night color.

6. As new products the new dyestuffs containing chromium obtained by causing unsulfonated dyestuffs of the triarylmethane series capable of being chromed to react on azodyestuffs containing chromium which dyestuffs form from dark red to black powders, dissolving in water to solutions with bluish-red to green and blackish-green colorations, yielding on wool, from bluish-red to blue and green fast tints, distinguished by their excellent fastness to milling and their good night color.

7. As new products the new dyestuffs containing chromium obtained by causing unsulfonated dyestuffs of the triaryl-methane series capable of being chromed to react on such azodyestuffs containing chromium, which are obtained by action of agents yielding chromium on monoazodyestuffs prepared by combining o-hydroxydiazo derivatives with naphthols, which dyestuffs form dark powders, dissolving in water to blue solutions having a red appearance and dyeing wool in an acid bath pure, level and fast blue and violet tints having a good night color.

8. As new products the new dyestuffs containing chromium obtained by causing unsulfonated dyestuffs of the triaryl-methane series capable of being chromed to react on such azodyestuffs containing chromium, which are obtained by combining o-hydroxydiazo derivatives of the naphthalene series with naphthols, which dyestuffs form dark powders, dissolving in water to blue solutions having a red appearance and dyeing wool in an acid bath pure, level and fast blue tints having a good night color.

In witness whereof I have hereunto signed my name this 20th day of February, 1925.

FRITZ STRAUB.